Patented Aug. 9, 1927.

1,638,076

UNITED STATES PATENT OFFICE.

WILLIAM H. WEISER, OF DALLAS, OREGON.

PROCESS OF HARDENING COPPER.

No Drawing.   Application filed October 11, 1923.   Serial No. 668,018.

This invention relates to a process for the hardening of copper, and has particular reference to a process wherein copper may be properly hardened in an extremely simple and inexpensive manner, and wherein the copper that is hardened by this process will maintain its temper indefinitely.

A particular object of this invention is the provision of such a process for hardening copper, wherein the copper hardened thereby may be used around salt water in the form of ship-building tools, etc., this process being especially good for the hardening of copper used in the manufacture of surgical instruments and the like.

In carrying out this invention, the copper is melted preferably in a crucible or by any other desirable method, and while the same is in its molten state, pulverized magnesia is poured therein and the mass properly stirred for thoroughly mixing the same with the copper.

For obtaining the proper hardening of the material, I preferably add four ounces of the pulverized magnesia to every one pound of copper, it being nevertheless understood that any temper may be resultant by adding more or less magnesia to the molten copper per pound.

In view of the above, it will at once be appreciated that my copper hardening process is extremely simple and inexpensive, and one wherein the proper hardening and temper of the copper will be resultant.

Having thus described my invention, what I claim as new is:

1. In a process of hardening copper, reducing the copper to a molten mass, and injecting into the same a quantity of pulverized magnesia.

2. In a copper hardening process, reducing the copper to a molten mass, supplying pulverized magnesia thereto, and thoroughly stirring the same into said molten copper, the proportion of the magnesia per pound of copper being substantially four ounces.

3. A process for changing the physical characteristics of copper, which consists in heating copper to a molten condition and in mixing a quantity of pulverized magnesia therewith, subsequently allowing the copper to cool.

4. As an article of manufacture, a product comprising copper and magnesia, said magnesia imparting to a copper, a character of hardness not inherent in the copper.

In testimony whereof I affix my signature.

WILLIAM H. WEISER.